United States Patent
Kim et al.

(10) Patent No.: US 10,171,147 B2
(45) Date of Patent: Jan. 1, 2019

(54) METHOD FOR TRANSMITTING SIGNAL IN MULTIPLE-ANTENNA WIRELESS COMMUNICATION SYSTEM AND APPARATUS FOR SAME

(71) Applicant: LG ELECTRONICS INC., Seoul (KR)

(72) Inventors: Youngtae Kim, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 15/304,046

(22) PCT Filed: Apr. 14, 2015

(86) PCT No.: PCT/KR2015/003719
§ 371 (c)(1),
(2) Date: Oct. 13, 2016

(87) PCT Pub. No.: WO2015/160170
PCT Pub. Date: Oct. 22, 2015

(65) Prior Publication Data
US 2017/0041057 A1 Feb. 9, 2017

Related U.S. Application Data

(60) Provisional application No. 61/978,992, filed on Apr. 14, 2014.

(51) Int. Cl.
*H04W 4/00* (2018.01)
*H04B 7/0491* (2017.01)
(Continued)

(52) U.S. Cl.
CPC ......... *H04B 7/0491* (2013.01); *H04B 7/0617* (2013.01); *H04W 36/0011* (2013.01)

(58) Field of Classification Search
None
See application file for complete search history.

(56) References Cited

U.S. PATENT DOCUMENTS

| 8,942,134 B1 * | 1/2015 | Kludt | H04W 16/28 370/252 |
| 2011/0038330 A1 * | 2/2011 | Luo | H04B 7/024 370/329 |

(Continued)

OTHER PUBLICATIONS

PCT International Application No. PCT/KR2015/003719, Written Opinion of the International Searching Authority dated Jul. 24, 2015, 24 pages.

(Continued)

*Primary Examiner* — Zewdu A Beyen
(74) *Attorney, Agent, or Firm* — Lee, Hong, Degerman, Kang & Waimey

(57) ABSTRACT

The present invention relates to a method and an apparatus for transmitting a signal of a first base station, for supporting a plurality of vertical directions in a wireless communication system which supports multiple antennas. Particularly, the method comprises the steps of: configuring a group so as to include at least one base station, among a plurality of base stations, for a first terminal having a position higher than those of the plurality of base stations; setting a specific sector for supporting coverage of the group; and determining whether to perform beamforming for the first terminal on the specific sector.

14 Claims, 10 Drawing Sheets

(51) Int. Cl.
*H04B 7/06* (2006.01)
*H04W 36/00* (2009.01)

(56) References Cited

U.S. PATENT DOCUMENTS

| | | |
|---|---|---|
| 2013/0044650 A1 | 2/2013 | Barker et al. |
| 2013/0235807 A1 | 9/2013 | Lee et al. |
| 2013/0272170 A1 | 10/2013 | Chatterjee et al. |
| 2014/0328257 A1* | 11/2014 | Kamlani ............... H04W 24/02 370/329 |

OTHER PUBLICATIONS

Intel Corporation, "Further details of 3D/FD MIMO scenarios and antenna models", R1-130921, 3GPP TSG-RAN WG1 #72bis, Apr. 6, 2013, 7 pages.

LG Electronics, "Considerations on 3D-channel modelling", R1-131306, 3GPP TSG RAN WG1 Meeting #72bis, Apr. 6, 2013, 4 pages.

* cited by examiner (a)

(b)

(a)

(b)

a : a sector located S
b : b sector located S
c : c sector located S a : a sector located S
b : b sector located S
c : c sector located S a : a sector located S
b : b sector located S
c : c sector located S

METHOD FOR TRANSMITTING SIGNAL IN MULTIPLE-ANTENNA WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2015/003719, filed on Apr. 14, 2015, which claims the benefit of U.S. Provisional Application No. 61/978,992, filed on Apr. 14, 2014, the contents of which are all hereby incorporated by reference herein in their entirety.

TECHNICAL FIELD

The present invention relates to a wireless communication system, and more particularly, to a method of transmitting a signal in a multi-antenna wireless communication system and an apparatus therefor.

BACKGROUND ART

Multiple-Input Multiple-Output (MIMO) technology is a technology capable of improving data transmission/reception efficiency using multiple transmit (Tx) antennas and multiple receive (Rx) antennas instead of using a single Tx antenna and a single Rx antenna. In particular, a transmitting end or a receiving end of a wireless communication system can increase capability or improve performance using multiple antennas. Accordingly, the MIMO technology can also be referred to as a multi-antenna technology.

In order to support multi-antenna transmission, it may be able to apply a precoding matrix to appropriately distribute transmission information to each antenna according to a channel status and the like. A legacy 3GPP (3$^{rd}$ Generation Partnership Project) LTE (Long Term Evolution) system supports maximum 4 transmission antennas (4 Tx) to perform downlink transmission and defines a precoding codebook according to the transmission antennas.

In a multi-antenna system-based cellular communication environment, data transfer rate can be enhanced via beamforming between a transmitting end and a receiving end. Whether to apply a beamforming scheme is managed based on channel information. In general, it may be able to use a scheme that a receiving end appropriately quantizes a channel estimated by a reference signal and the like using a codebook and gives a transmitting end feedback on the quantized channel.

In the following, a spatial channel matrix (simply, channel matrix) capable of being used for generating a codebook is briefly explained. The spatial channel matrix (or, channel matrix) can be represented as follows.

$$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

In this case, H (i, k) corresponds to a spatial channel matrix, Nr corresponds to the number of reception antennas, Nt corresponds to the number of transmission antennas, r corresponds to an index of an reception antenna, t corresponds to an index of a transmission antenna, i corresponds to an index of an OFDM (or SC-FDMA) symbol, and k corresponds to an index of a subcarrier.

$h_{r,t}(i,k)$ corresponds to an element of a channel matrix H (i, k) indicating a state of an $r^{th}$ channel and a $t^{th}$ antenna on an $i^{th}$ symbol and $k^{th}$ subcarrier.

A spatial channel covariance matrix capable of being used in the present invention is briefly explained in the following. The spatial channel covariance matrix can be represented by such a sign as R. In particular, the spatial channel covariance matrix can be represented as $R=E[H_{i,k}{}^{H}H_{i,k}]$. In this case, H and R correspond to a spatial channel matrix and a spatial channel covariance matrix, respectively. E[ ] corresponds to a mean, i corresponds to a symbol index, and k corresponds to a frequency index.

SVD (singular value decomposition) is one of important methods for decomposing a rectangular matrix. The SCD is widely used in signal processing and statistics. The SVD generalizes a spectrum theory of a matrix in response to a random rectangular matrix. An orthogonal square matrix can be decomposed to a diagonal matrix using the spectrum theory based on an Eigen value. Assume that a channel matrix H corresponds to m×n matrix consisting of a set element of real numbers or complex numbers. In this case, the matrix H can be represented by multiplication of three matrixes described in the following.

$$H_{m \times n} = U_{m \times m} \Sigma_{m \times n} V_{n \times n}{}^{H}$$

In this case, U and V correspond to unitary matrixes and Σ corresponds to m×n diagonal matrix including a singular value which is not a negative value. The singular value corresponds to $\Sigma = diag(\sigma_1 \ldots \sigma_r), \sigma_i = \sqrt{\lambda_i}$. As mentioned above, when a matrix is represented by multiplication of three matrixes, it is referred to as singular value decomposition. It may be able to handle a much more general matrix using the singular value decomposition compared to Eigen value decomposition capable of decomposing an orthogonal square matrix only. The singular value decomposition and the Eigen value decomposition are related to each other.

When a matrix H corresponds to an Hermite matrix which is positive definite, all Eigen values of the H correspond to real numbers which are not negative numbers. In this case, a singular value and a singular vector of the H correspond to real numbers which are not negative numbers. In particular, the singular value and the singular vector of the H become identical to the Eigen value and the Eigen vector of the H. Meanwhile, EVD (Eigen value Decomposition) can be represented as follows (in this case, Eigen value may correspond to λ1, . . . , λr).

$$HH^{H} = (U\Sigma V^{H})(U\Sigma V^{H})^{H} = U\Sigma\Sigma^{T}U^{H}$$

$$H^{H}H = (U\Sigma V^{H})(U\Sigma V^{H})^{H} = V\Sigma^{T}\Sigma V$$

In this case, Eigen value may correspond to λ1, . . . , λr. When singular value decomposition is performed on $HH^{H}$, it is able to know information on U among U and V that indicate channel direction. When singular value decomposition is performed on $H^{H}H$, it is able to know information on V. In general, each of a transmitting end and a receiving end performs beamforming to achieve a higher transfer rate in MU-MIMO (multi user-MIMO). If a beam of the receiving end and a beam of the transmitting end are represented by a matrix T and a matrix W, respectively, a channel to which beamforming is applied can be represented as THW=TU(Σ)VW. Hence, it may be preferable to generate a reception beam on the basis of the U and generate a transmission beam on the basis of the V to achieve a higher transfer rate.

In general, main concern in designing a codebook is to reduce feedback overhead using the number of bits as small as possible and precisely quantify a channel to achieve sufficient beamforming gain. One of schemes of designing a codebook, which is proposed or selected by recent communication standard such as 3GPP LTE (3rd Generation Partnership Project Long Term Evolution), LTE-Advanced, IEEE 16m system, etc. corresponding to an example of a mobile communication system, is to transform a codebook using a long-term covariance matrix of a channel as shown in equation 1 in the following.

$$W'=\text{norm}(RW) \quad \text{[Equation 1]}$$

In this case, W corresponds to a legacy codebook for reflecting short-term channel information, R corresponds to a long-term covariance matrix of a channel H, and norm (A) corresponds to a normalized matrix that norm is normalized by 1 according to each column of a matrix A. W' corresponds to a final codebook transformed from the legacy codebook W using the channel matrix H, the long-term covariance matrix R of the channel matrix H and a norm function.

The R, which is the long-term covariance matrix of the channel matrix H, can be represented as equation 2 in the following.

$$R = E[H^H H] = V\Lambda V^H = \sum_{i=1}^{Nt} \sigma_i v_i v_i^H \quad \text{[Equation 2]}$$

In this case, if the singular value decomposition is performed on the R, which is the long-term covariance matrix of the channel matrix H, the R is decomposed to $V\Lambda V^H$. V corresponds to Nt×Nt unitary matrix and has Vi as an $i^{th}$ column vector. $\Lambda$ corresponds to a diagonal matrix and has $\sigma_i$ as an $i^{th}$ diagonal component. $V^H$ corresponds to an Hermitian matrix of the V. And, $\sigma_i$, $V_i$ respectively correspond to an $i^{th}$ singular value and an $i^{th}$ singular column vector corresponding to the $i^{th}$ singular value ($\sigma_1 \geq \sigma_2 \geq \ldots \geq \sigma_{Nt}$).

DISCLOSURE OF THE INVENTION

Technical Task

A technical task of the present invention is to provide a method of transmitting a signal in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of transmitting a signal, which is transmitted by a first base station supporting a plurality of vertical beam directions in a wireless communication system supporting multiple antennas, includes the steps of setting a group including at least one or more base stations for a first terminal of a location higher than locations of a plurality of base stations, setting a specific sector for supporting coverage of the group, and determining whether to perform beamforming for the first terminal on the specific sector.

Preferably, if the beamforming for the first terminal is determined to be performed, the method can further include the step of transmitting information, which is transmitted by the first base station, indicating to perform the beamforming for the first terminal to a plurality of the base stations.

More preferably, if the information indicating to perform the beamforming for the first terminal is received from one of a plurality of the base stations, the beamforming for the first terminal can be configured to be terminated.

Preferably, the step of determining whether to perform the beamforming can be determined based on information on whether or not beamforming to the first terminal is available received from at least one second base station included in the group.

Preferably, the method can further include the step of receiving a handover request of the first terminal from at least one second base station included in the group.

Preferably, the step of determining whether to perform the beamforming can be determined to be performed to the first terminal when traffic amount received from at least one second base station included in the group is smaller than traffic amount of the first base station.

More preferably, the specific sector may correspond to a vertical sector which is determined according to the traffic amount of the first base station and the traffic amount of the second base station.

Preferably, the at least one or more base stations included in the group can be configured to have a CRS (cell-specific reference signal) of an identical identifier (ID).

Preferably, whether to perform the beamforming for the first terminal can be configured to be periodically determined according to a predetermined period.

To further achieve these and other advantages and in accordance with the purpose of the present invention, according to a different embodiment, a method of transmitting a signal, which is transmitted by a first base station supporting a plurality of vertical beam directions in a wireless communication system supporting multiple antennas, includes the steps of setting a group including at least one or more base stations for a first terminal targeted by a specific beam direction higher than a prescribed height among a plurality of the vertical beam directions among a plurality of base stations, setting a specific sector for supporting coverage of the group, and determining whether to perform beamforming for the first terminal on the specific sector.

To further achieve these and other advantages and in accordance with the purpose of the present invention, according to a further different embodiment, a first base station supporting a plurality of vertical beam directions in a wireless communication system supporting multiple antennas includes a radio frequency unit and a processor, the processor configured to set a group including at least one or more base stations for a first terminal of a location higher than locations of a plurality of base stations, the processor configured to set a specific sector for supporting coverage of the group, the processor configured to determine whether to perform beamforming for the first terminal on the specific sector.

Advantageous Effects

According to embodiments of the present invention, it is able to provide a method of transmitting a signal in a wireless communication system and an apparatus therefor.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Mode for Invention

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following detailed description is given under the assumption that 3GPP LTE mobile communication systems are used. However, the description may be applied to any other mobile communication system except for specific features inherent to the 3GPP LTE systems.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), and an advanced mobile station (AMS). Also, it is assumed that a base station refers to a random node of a network terminal, such as Node B, eNode B, and an access point (AP), which performs communication with the user equipment.

In a mobile communication system, a user equipment may receive information from a base station through a downlink and transmit information to the base station through an uplink. The information that the user equipment transmits or receives includes data and various types of control information. There are various physical channels according to the types and usages of information that the user equipment transmits or receives.

As an example of a mobile communication system to which the present invention is applicable, a 3rd Generation Partnership Project Long Term Evolution (hereinafter, referred to as LTE) communication system is described in brief.

Figure 1:
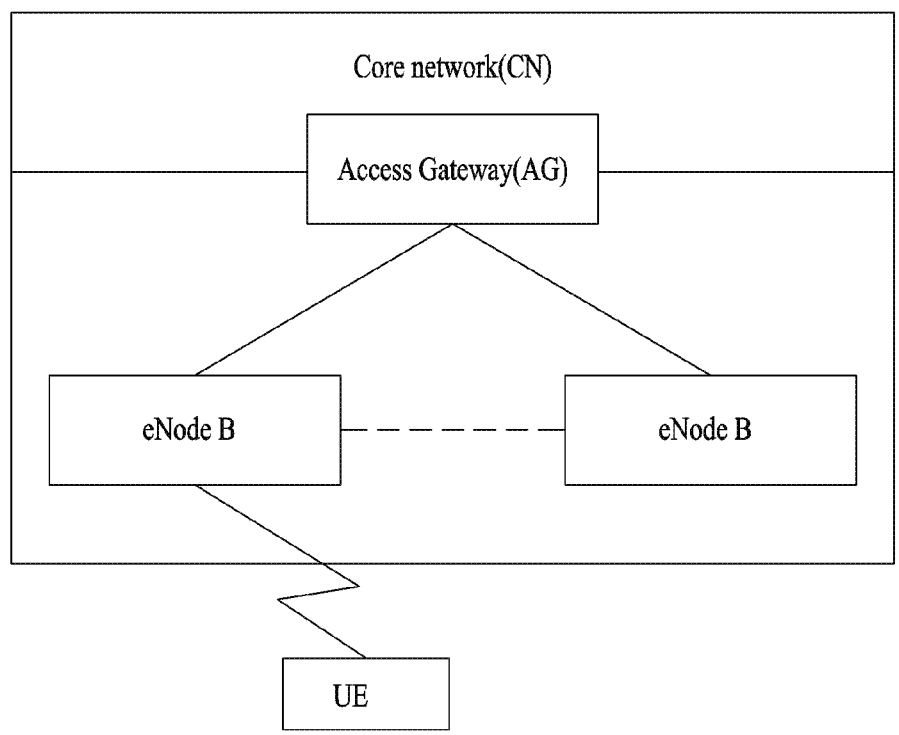
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system.

An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information.

In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Recently, 3GPP has standardized technology subsequent to LTE. In this specification, the technology will be referred to as "LTE-Advanced" or "LTE-A". A main difference between the LTE system and the LTE-A system is a system bandwidth. The LTE-A system aims to support a wideband of up to 100 MHz. To achieve this, the LTE-A system employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in the LTE system. Each frequency block is transmitted using a component carrier.

Figure 2:
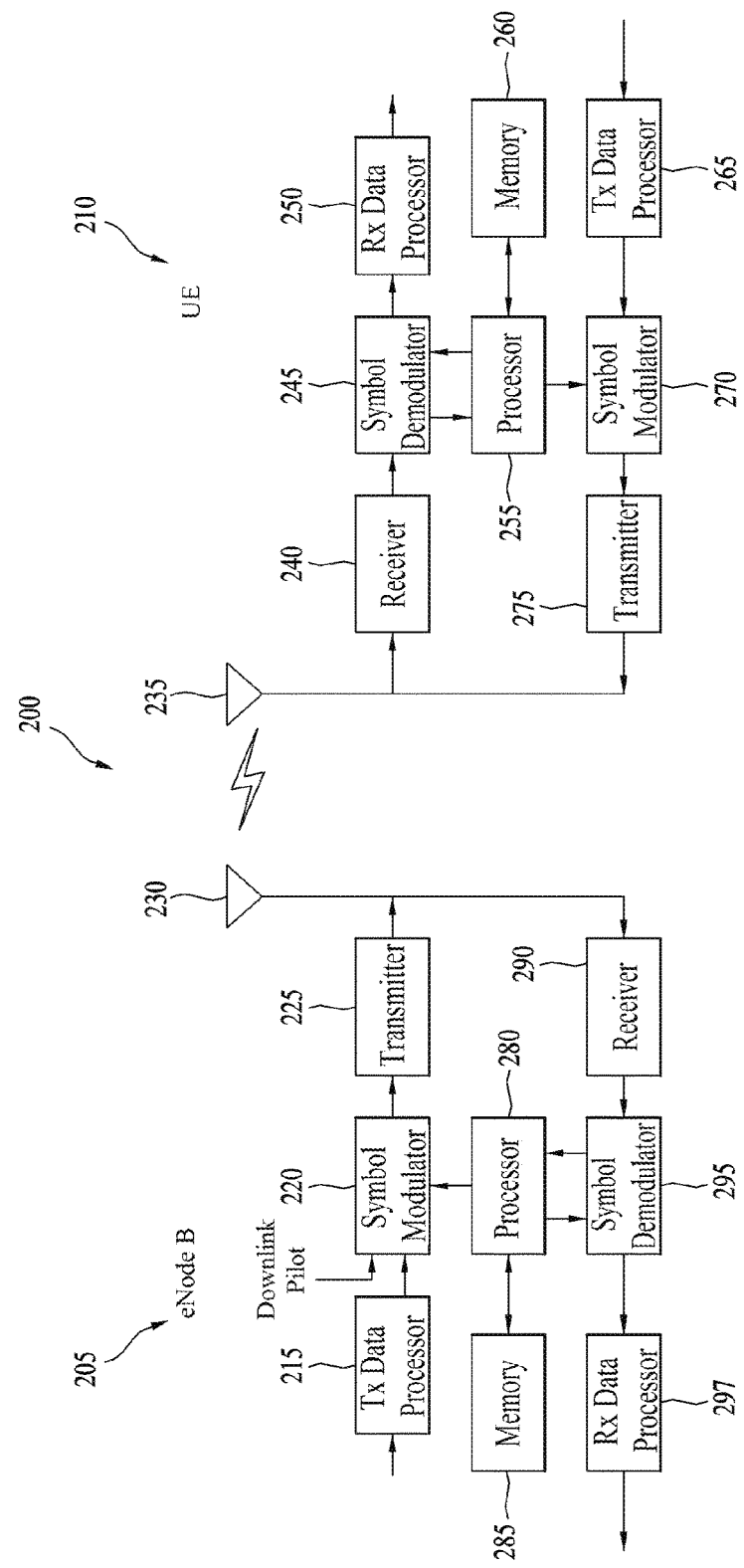
FIG. 2 is a block diagram illustrating configurations of a base station 205 and a user equipment 210 in a wireless communication system 200 according to the present invention.

FIG. 2 is a block diagram illustrating configurations of a base station 205 and a user equipment 210 in a wireless communication system 200.

Although one base station 205 and one user equipment 210 are shown for simplification of a wireless communication system 200, the wireless communication system 200 may include one or more base stations and/or one or more user equipments.

Referring to FIG. 2, the base station 105 may include a transmitting (Tx) data processor 215, a symbol modulator 220, a transmitter 225, a transmitting and receiving antenna 230, a processor 280, a memory 285, a receiver 290, a symbol demodulator 295, and a receiving (Rx) data processor 297. The user equipment 210 may include a Tx data processor 265, a symbol modulator 270, a transmitter 275, a transmitting and receiving antenna 235, a processor 255, a memory 260, a receiver 240, a symbol demodulator 255, and an Rx data processor 250. Although the antennas 230 and 235 are respectively shown in the base station 205 and the user equipment 210, each of the base station 205 and the user equipment 210 includes a plurality of antennas. Accordingly, the base station 205 and the user equipment 210 according to the present invention support a multiple input multiple output (MIMO) system. Also, the base station 205 according to the present invention may support both a single user-MIMO (SU-MIMO) system and a multi user-MIMO (MU-MIMO) system.

On a downlink, the Tx data processor 215 receives traffic data, formats and codes the received traffic data, interleaves and modulates (or symbol maps) the coded traffic data, and provides the modulated symbols ("data symbols"). The symbol modulator 220 receives and processes the data symbols and pilot symbols and provides streams of the symbols.

The symbol modulator 220 multiplexes the data and pilot symbols and transmits the multiplexed data and pilot symbols to the transmitter 225. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 receives the streams of the symbols and converts the received streams into one or more analog symbols. Also, the transmitter 225 generates downlink signals suitable for transmission through a radio channel by additionally controlling (for example, amplifying, filtering and frequency upconverting) the analog signals. Subsequently, the downlink signals are transmitted to the user equipment through the antenna 230.

In the user equipment 210, the antenna 235 receives the downlink signals from the base station 205 and provides the received signals to the receiver 240. The receiver 240 controls (for example, filters, amplifies and frequency downcoverts) the received signals and digitalizes the controlled signals to acquire samples. The symbol demodulator 245 demodulates the received pilot symbols and provides the demodulated pilot symbols to the processor 255 to perform channel estimation.

Also, the symbol demodulator 245 receives a frequency response estimation value for the downlink from the processor 255, acquires data symbol estimation values (estimation values of the transmitted data symbols) by performing data demodulation for the received data symbols, and provides the data symbol estimation values to the Rx data processor 250. The Rx data processor 250 demodulates (i.e., symbol de-mapping), deinterleaves, and decodes the data symbol estimation values to recover the transmitted traffic data.

Processing based on the symbol demodulator 245 and the Rx data processor 250 is complementary to processing based on the symbol demodulator 220 and the Tx data processor 215 at the base station 205.

On an uplink, the Tx data processor 265 of the user equipment 210 processes traffic data and provides data symbols. The symbol modulator 270 receives the data symbols, multiplexes the received data symbols with the pilot symbols, performs modulation for the multiplexed symbols, and provides the streams of the symbols to the transmitter 275. The transmitter 275 receives and processes the streams of the symbols and generates uplink signals. The uplink signals are transmitted to the base station 205 through the antenna 235.

The uplink signals are received in the base station 205 from the user equipment 210 through the antenna 230, and the receiver 290 processes the received uplink signals to acquire samples. Subsequently, the symbol demodulator 295 processes the samples and provides data symbol estimation values and the pilot symbols received for the uplink. The Rx data processor 297 recovers the traffic data transmitted from the user equipment 210 by processing the data symbol estimation values.

The processors 255 and 280 of the user equipment 210 and the base station 205 respectively command (for example, control, adjust, manage, etc.) the operation at the user equipment 210 and the base station 205. The processors 255 and 280 may respectively be connected with the memories 260 and 285 that store program codes and data. The memories 260 and 285 respectively connected to the processor 280 store operating system, application, and general files therein.

Each of the processors 255 and 280 may be referred to as a controller, a microcontroller, a microprocessor, and a microcomputer. Meanwhile, the processors 255 and 280 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 255 and 280. Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 255 and 280, or may be stored in the memories 260 and 285 and driven by the processors 255 and 280.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

The term, base station used in the present invention may refer to a "cell or sector" when used as a regional concept. A serving base station (or serving cell) may be regarded as a base station which provides main services to UEs and may transmit and receive control information on a coordinated multiple transmission point. In this sense, the serving base station (or serving cell) may be referred to as an anchor base station (or anchor cell). Likewise, a neighboring base station may be referred to as a neighbor cell used as a local concept.

Multiple Antenna System

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 3:
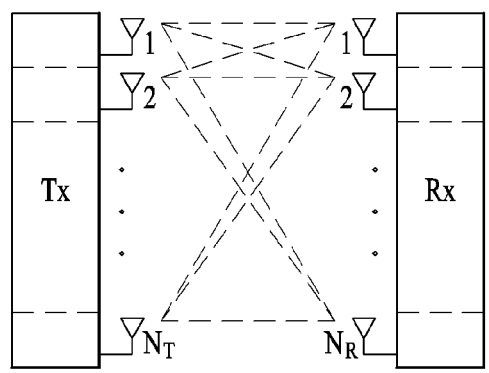
FIG. 3 is a diagram for a configuration of a general MIMO communication system.
Figure 3:
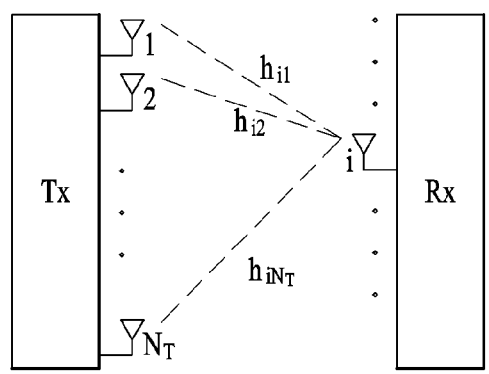

FIG. 3(a) shows the configuration of a wireless communication system including multiple antennas. As shown in FIG. 3(a), the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

In the meantime, individual transmission information pieces $s_1, s_2, \ldots, s_{NT}$ may have different transmission powers. In this case, if the individual transmission powers are denoted by $P_1, P_2, \ldots, P_{NT}$, transmission information having an adjusted transmission power can be represented by a specific vector shown in the following equation 3.

$$\hat{s} = [\hat{s}_1, \hat{s}_2, \ldots, \hat{s}_{N_T}]^T = [Ps_1, Ps_2, \ldots, Ps_{N_T}]^T \quad \text{Equation 3}$$

In Equation 3, ŝ is a transmission vector, and can be represented by the following equation 4 using a diagonal matrix P of a transmission power.

$$\hat{S} = \begin{bmatrix} P_1 & & 0 \\ & P_2 & \\ & & \ddots \\ 0 & & P_{N_T} \end{bmatrix} \begin{bmatrix} S_1 \\ S_2 \\ \vdots \\ S_{N_T} \end{bmatrix} = Ps \quad \text{[Equation 4]}$$

In the meantime, the information vector ŝ having an adjusted transmission power is applied to a weight matrix W, so that $N_T$ transmission signals $x_1, x_2, \ldots, x_{NT}$ to be actually transmitted are configured. In this case, the weight matrix W is adapted to properly distribute transmission information to individual antennas according to transmission channel situations. The above-mentioned transmission signals $x_1, x_2, \ldots, x_{NT}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{S}_1 \\ \hat{S}_2 \\ \vdots \\ \hat{S}_j \\ \vdots \\ \hat{S}_{N_T} \end{bmatrix} = W\hat{s} = WPs \quad \text{[Equation 5]}$$

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. Examples of vector expressions are given as below. FIG. 3(b) illustrates channels from $N_T$ Tx antennas to an $i^{th}$ Rx antenna.

As illustrated in FIG. 3(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_T}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 10]}$$

$$\begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

As a multi-antenna transmission and reception scheme used for operating a multi-antenna system, it may be able to use FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between transmission antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as equation 12 and equation 13, respectively. The equation 12 indicates a block code in case of 2 transmission antennas and the equation 13 indicates a block code in case of 4 transmission antennas.

$$\frac{1}{\sqrt{2}} \begin{pmatrix} S_1 & S_2 \\ -S_2^* & S_1^* \end{pmatrix} \quad \text{[Equation 12]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 13]}$$

In the equations 12 and 13, Si (i=1, 2, 3, 4) corresponds to a modulated data symbol. And, in the equations 12 and 13, a row of a matrix corresponds to an antenna port and a column of the matrix corresponds to time (STBC) or frequency (SFBC).

Figure 4:
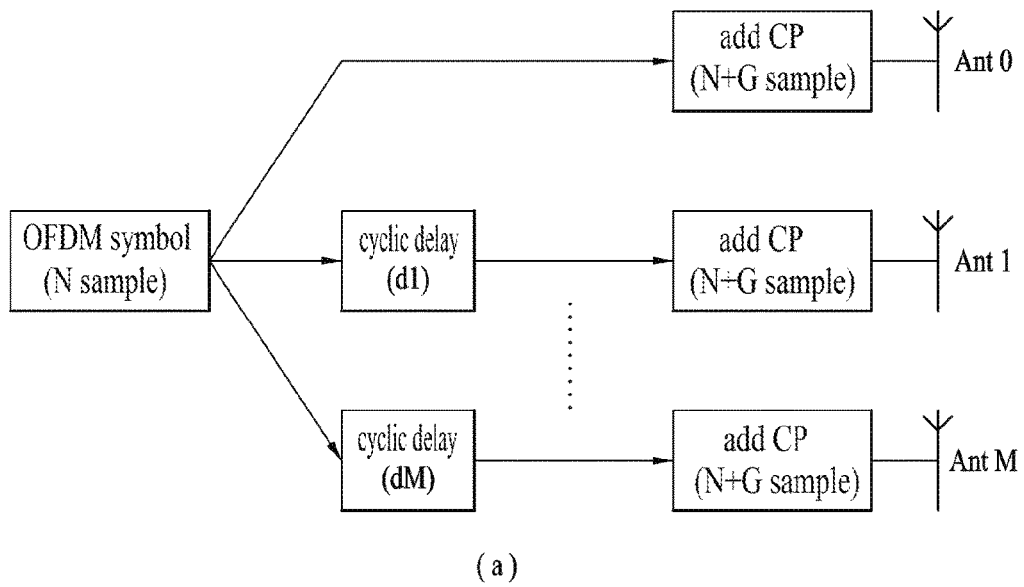
FIG. 4 is a diagram for an example of a general CDD structure in a MIMO system.
Figure 4:
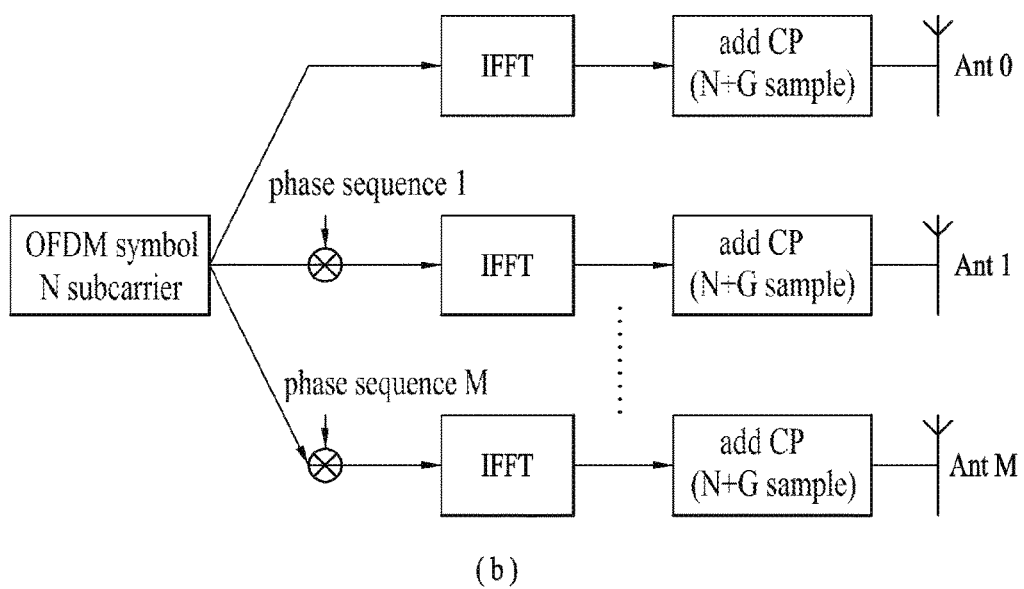

Meanwhile, among the aforementioned MIMO transmission schemes, the CDD scheme corresponds to a scheme of increasing frequency diversity by increasing delay propagation on purpose. FIG. 4 shows an example of a general CDD structure in a multi-antenna system. FIG. 4(a) shows a scheme of applying cyclic delay in time domain. As shown in FIG. 4(b), the CDD scheme applying the cyclic delay of FIG. 4(a) can also be implemented by applying phase-shift diversity.

Codebook-Based Precoding Scheme

In order to support MIMO antenna transmission, it may be able to apply precoding configured to appropriately distribute transmission information to each of multiple antennas according to a channel status and the like. A codebook-based precoding scheme corresponds to a scheme that a transmitting end and a receiving end determine a set of precoding matrixes in advance, the receiving end measures channel information from the transmitting end and gives feedback on a most suitable precoding matrix (i.e., precoding matrix index (PMI) to the transmitting end, and the transmitting end applies appropriate precoding to signal transmission based on the PMI.

Since the codebook-based precoding scheme is a scheme of selecting an appropriate precoding matrix from the predetermined set of precoding matrixes, although an optimized precoding is not always applied, feedback overhead can be reduced compared to a case of explicitly giving feedback on optimized precoding information to actual channel information.

Figure 5:
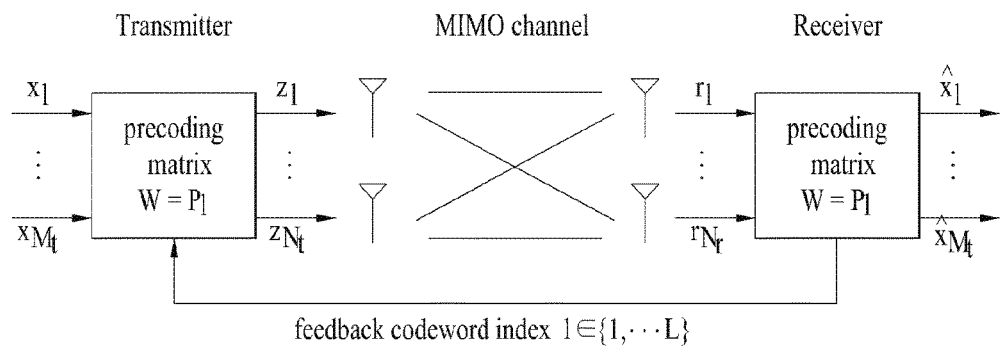
FIG. 5 is a diagram for explaining a basic concept of a codebook-based precoding.

FIG. 5 is a diagram for explaining a basic concept of a codebook-based precoding.

In case of following a codebook-based precoding scheme, a transmitting end and a receiving end share codebook information including the prescribed number of precoding matrixes, which are predetermined according to a transmission rank, the number of antennas, and the like. In particular, when feedback information is finite, the codebook-based precoding scheme can be used. The receiving end measures a channel state via a reception signal and may be then able to give feedback on information on the finite number of preferred precoding matrixes (i.e., an index of a corresponding precoding matrix) to the transmitting end based on the aforementioned codebook information. For instance, the receiving end measures a reception signal using ML (maximum likelihood) or MMSE (minimum mean square error) scheme and may be then able to select an optimized precoding matrix. Although FIG. 5 shows a case that the receiving end transmits precoding matrix information to the transmitting end according to a codeword, by which the present invention may be non-limited.

Having received the feedback information from the receiving end, the transmitting end can select a specific precoding matrix from a codebook based on the received information. The transmitting end, which has selected the precoding matrix, performs precoding in a manner of multiplying the number of layer signals corresponding to a transmission rank by the selected precoding matrix and may be then able to transmit a transmission signal on which the precoding is performed via a plurality of antennas. In a precoding matrix, the number of rows is identical to the number of antennas and the number of columns is identical to a rank value. Since the rank value is identical to the number of layers, the number of columns is identical to the number of layers. For instance, if the number of transmission antennas corresponds to 4 and the number of transmission layers corresponds to 2, a precoding matrix can be configured by a 4×2 matrix. Information transmitted via each layer can be mapped to each antenna through the precoding matrix.

Having received a signal, which is transmitted from the transmitting end in a manner of being pre-coded, the receiving end can restore the received signal in a manner of performing reverse processing on the precoding processed in the transmitting end. In general, since a precoding matrix satisfies a unitary matrix (U) condition such as $U*U^H=I$, the reverse processing performed on the precoding can be performed using a scheme of multiplying Hermite matrix ($P^H$) of a precoding matrix (P) used in the precoding of the transmitting end by the received signal.

For instance, Table 1 in the following shows a codebook used for downlink transmission using 2 transmission antennas in 3GPP LTE release-8/9 and Table 2 in the following shows a codebook used for downlink transmission using 4 transmission antennas in 3GPP LTE release-8/9.

TABLE 1

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1&1\\1&-1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1&1\\j&-j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers u | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |

TABLE 2-continued

| Codebook index | $u_n$ | Number of layers u | | | |
|---|---|---|---|---|---|
| | | 1 | 2 | 3 | 4 |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ can be obtained by a set {s} configured from an equation represented as $W_n = I - 2u_n u_n^H / u_n^H u_n$. In this case, I indicates a 4×4 single matrix and $u_n$ is a value given in Table 2.

As shown in Table 1, in case of a codebook for 2 transmission antennas, it may have total 7 precoding vectors/matrixes. In this case, since a single matrix is used for an open-loop system, total 6 precoding vectors/matrixes are used for a close-loop system. And, in case of a codebook for 4 transmission antennas shown in Table 2, it may have total 64 precoding vectors/matrixes.

The aforementioned codebook has a common property such as a CM (constant modulus) property, a nested property, a constrained alphabet property, and the like. The CM property corresponds to a property that each element of all precoding matrixes in a codebook does not include '0' and has a same size. The nested property corresponds to a property that a precoding matrix of a lower rank is configured by a subset of a specific column of a precoding matrix of a higher rank. The constrained alphabet property corresponds to a property that an alphabet of each element of all precoding matrixes in a codebook is configured by $$\left\{ \pm 1, \pm j \pm \frac{(1+j)}{\sqrt{2}}, \pm \frac{(-1+j)}{\sqrt{2}} \right\}.$$

In Table 2, $W_n^{\{s\}}$ can be obtained from a set {s} configured by an equation represented as $W_n = I - 2u_n u_n^H / u_n^H u_n$. In this case, I corresponds to 4×4 single matrix and $u_n$ corresponds to a value given by Table 2.

As shown in Table 1, a codebook for two transmission antennas includes 7 precoding vectors/matrixes in total. In this case, since a single matrix is used for an open-loop system, for precoding of a closed-loop system, there are 6 precoding vectors/matrixes in total. And, as shown in Table 2, a codebook for 4 transmission antennas has 64 precoding vectors/matrixes in total.

The aforementioned codebook has a common property such as a CM (constant modulus) property, a nested property, a constrained alphabet property, and the like. The CM property corresponds to a property that each element of all precoding matrixes in a codebook does not include '0' and has a same size. The nested property corresponds to a property that a precoding matrix of a lower rank is configured by a subset of a specific column of a precoding matrix of a higher rank. The constrained alphabet property corresponds to a property that an alphabet of each element of all precoding matrixes in a codebook is configured by $$\left\{ \pm 1, \pm j \pm \frac{(1+j)}{\sqrt{2}}, \pm \frac{(-1+j)}{\sqrt{2}} \right\}.$$

Feedback Channel Structure

Basically, since a base station is unable to know information on a downlink channel in FDD (frequency division duplex) system, the base station uses channel information fed back by a UE for downlink transmission. In case of a legacy 3GPP LTE release-8/9 system, a UE can feedback downlink channel information via PUCCH or PUSCH. In case of the PUCCH, the PUCCH periodically feedbacks channel information. In case of the PUSCH, the PUSCH aperiodically feedbacks channel information according to a request of the base station. And, channel information can be fed back in response to the whole of assigned frequency bands (i.e., wideband (WB)) or the specific number of RBs (i.e., subband (SB)).

Extended Antenna Configuration

Figure 6:
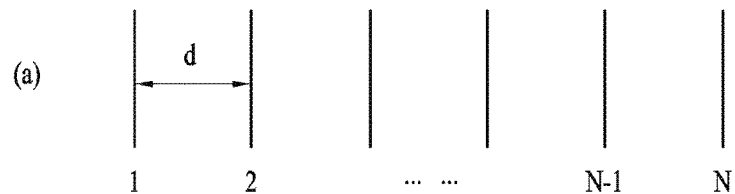
FIG. 6 is a diagram for examples of configuring 8 transmission antennas.
Figure 6:
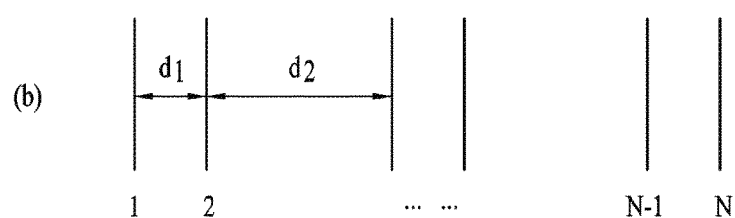
Figure 6:
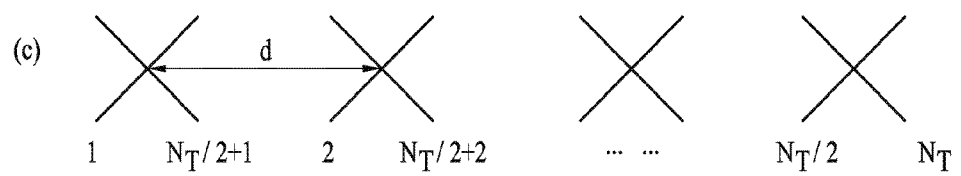

FIG. 6 is a diagram for examples of configuring 8 transmission antennas.

FIG. 6(a) shows a case that N numbers of antennas configure an independent channel without grouping. In general, this case is referred to as an ULA (uniform linear array). If a plurality of antennas are deployed in a manner of being apart from each other, a space of a transmitter and/or a receiver may not be sufficient enough for configuring channels independent from each other.

FIG. 6(b) shows an antenna configuration (paired ULA) of a ULA scheme that two antennas make a pair. In this case, an associated channel may exist between the two antennas making a pair and an independent channel may exist with an antenna of a different pair.

Meanwhile, unlike a legacy 3GPP LTE release-8/9 using 4 transmission antennas in downlink, 3GPP LTE release-10 system may use 8 transmission antennas in downlink. In order to apply the extended antennas configuration, it is necessary to install many antennas in an insufficient space. Hence, the ULA antenna configurations shown in FIGS. 6(a) and (b) may not be appropriate for the extended configuration. Hence, as shown in FIG. 6(c), it may consider applying a dual-pole (or cross-pole) antenna configuration. If transmission antennas are configured using the dual-pole (or cross-pole) antenna configuration, although a distance d between antennas is relatively short, it is able to transmit data of high throughput by lowering antenna correlation.

Codebook Structures

As mentioned in the foregoing description, if a predefined codebook is shared between a transmitting end and receiving end, it is able to reduce overhead of the receiving end resulted from making a feedback on precoding information to be used for MIMO transmission of the transmitting end. Hence, it is able to apply efficient precoding.

As an example of configuring a predetermined codebook, it may be able to configure a precoder matrix using a DFT (Discrete Fourier Transform) matrix or a Walsh matrix. Or, it may be able to configure a precoder of various forms in a manner of combining with a phase shift matrix or a phase shift diversity matrix.

In case of a co-polarization antenna system, a codebook of a DFT system shows good performance. In this case, when the DFT matrix-based codebook is configured, n×n DFT matrix can be defined as equation 14 in the following.

DFTn: $D_n(k,l)=1/\sqrt{n}\exp(-j2\pi kl/n)$, $k,l=0,1,\ldots,n-1$ [Equation 14]

The DFT matrix shown in the equation 14 exists as a single matrix in response to a specific size n. Hence, in order to define various precoding matrixes and appropriately use the various precoding matrixes according to a situation, it may consider additionally configuring and using a rotated version of a DFTn matrix. Equation 15 in the following shows an example of a rotated DFTn matrix.

rotated DFTn: $D_n^{(G,g)}(k,l)=1/\sqrt{n}\exp(-j2\pi k(l+g/G)/n)$,
$k,l=0,1,\ldots,n-1$, $g=0,1,\ldots,G$. [Equation 15]

If a DFT matrix is configured using the equation 15, it may be able to generate G number of rotated DFTn matrixes and the generated matrixes satisfy a property of a DFT matrix.

In the following, a householder-based codebook structure is explained. The householder-based codebook structure corresponds to a codebook configured by a householder matrix. The householder matrix is a matrix used for householder transform. The householder transform is a sort of linear transformations and can be used for performing QR decomposition. The QR decomposition is to decompose a matrix into an orthogonal matrix (Q) and an upper triangular matrix (R). The upper triangular matrix corresponds to a square matrix that all components below a main diagonal line component are 0. An example of 4×4 householder matrix is shown in equation 16 in the following.

$$M_1 = I_4 - 2u_0 u_1^H \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$ [Equation 16]

$u_0^T = [1 \quad -1 \quad -1 \quad -1]$

It may be able to generate 4×4 unitary matrix including a CM property by the householder transform. Similar to a codebook for 4 transmission antennas shown in Table 2, n×n precoding matrix can be generated using the householder transform and it may be able to configure the precoding matrix to be used for rank transmission less than n using a column subset of the generated precoding matrix.

Codebook for 8 Transmission Antennas

In 3GPP LTE release-10 system including an extended antenna configuration (e.g., 8 transmission antennas), it may be able to apply a feedback scheme previously used in a legacy 3GPP LTE release-8/9 system in a manner of extending the feedback scheme. For example, it may be able to feedback such channel state information (CSI) as an RI (rank indicator), a PMI (precoding matrix index), CQI (channel quality information) and the like. In the following, a method of designing a dual precoder-based feedback codebook capable of being used in a system supporting an extended antenna configuration is explained. In order to indicate a precoder to be used for MIMO transmission of a transmitting end in the dual precoder-based feedback codebook, a receiving end can transmit a precoding matrix index to the transmitting end. A precoding matrix can be indicated by a combination of two PMIs different from each other. In particular, if the receiving end feedbacks the two PMIs different from each other (i.e., a first PMI and a second PMI) to the transmitting end, the transmitting end determines a precoding matrix indicated by the first and the second PMI and may be then able to apply the determined precoding matrix to MIMO transmission.

In designing the dual precoder-based feedback codebook, it may consider MIMO transmission transmitted by 8 transmission antennas, whether or not single user-MIMO (SU-MIMO) and multiple user-MIMO (MU-MIMO) are supported, suitability of various antenna configurations, a reference of codebook design, a size of a codebook, and the like.

When a codebook is applied to MIMO transmission transmitted by 8 transmission antennas, if the codebook is greater than rank 2, SU-MIMO is supported only. If the codebook is equal to or less than the rank 2, it may consider designing a feedback codebook optimized to both the SU-MIMO and the MU-MIMO and the feedback codebook appropriate for various antenna configurations.

Regarding the MU-MIMO, it may be preferable to make UEs participating in the MU-MIMO to be separated from each other in a correlation domain. Hence, it is necessary to design a codebook for the MU-MIMO to be properly operated on a channel of high correlation. Since DFT vectors provide good performance on the channel of high correlation, it may consider including a DFT vector in a set of codebooks up to rank-2. And, in high scattering propagation environment (e.g., indoor environment including many reflected waves) capable of generating many spatial channels, a SU-MIMO operation may be more suitable as a MIMO transmission scheme. Hence, it may be able to configure a codebook for a rank greater than rank-2 to have good performance of identifying multiple layers.

When a precoder for MIMO transmission is designed, it may be preferable to make a precoder structure have good performance in response to various antenna configurations (low correlation, high correlation, cross-polarization, and the like). In case of arranging 8 transmission antennas, it may be able to configure a cross-polarization array including 4 λantenna space as a low-correlation antenna configuration, a ULA including 0.5 λantenna space as a high-correlation antenna configuration, or a cross-polarization array including 0.5 λantenna space as a cross-polarization antenna configuration. A DFT-based codebook structure can provide good performance in response to the high-correlation antenna configuration.

Meanwhile, block diagonal matrixes may be more suitable for the cross-polarization antenna configuration. Hence, if a diagonal matrix is introduced to a codebook for 8 transmission antennas, it is able to configure a codebook capable of providing goof performance to all antenna configurations.

As mentioned in the foregoing description, a reference of codebook design is to satisfy a unitary codebook, a CM property, a constrained alphabet property, an appropriate codebook size, a nested property and the like. The reference is applied to 3GPP LTE release-8/9 codebook design. It may consider applying the reference of codebook design to 3GPP LTE release-10 codebook design supporting an extended antenna configuration as well.

In relation to a size of a codebook, in order to sufficiently support a merit of using 8 transmission antennas, it is necessary to increase the size of the codebook. In order to obtain a sufficient precoding gain from the 8 transmission antennas in low correlation environment, a codebook (e.g., a codebook of a size greater than 4 bits in response to a rank 1 and a rank 2) of a big size may be required. A codebook of a size of 4 bits may be sufficient in obtaining a precoding gain in high correlation environment. Yet, in order to achieve a multiplexing gain of the MU-MIMO, it may be able to increase a codebook size for the rank 1 and the rank 2.

Based on the aforementioned description, a configuring/signaling technology for determining base stations supporting UEs located at a (geographically) higher place is explained based on a 3D MIMO system in which 2D-AAS (2 dimensional active antenna system) is installed.

In a wireless communication system appearing after LTE Rel-12, discussion on whether to introduce an antenna system utilizing an AAS is in progress. Since each antenna of the AAS is configured by an active antenna including an active circuit, it is able to reduce interference or support efficient performance of beamforming by adaptively changing an antenna pattern to wireless communication environment.

If the AAS is constructed in 2 dimension (2D-AAS), since it is able to control a beam direction not only to a legacy horizontal surface but also to a vertical surface using a main lobe of an antenna in terms of an antenna pattern, it may be able to more efficiently perform beam adaptation in 3 dimensional manner. Hence, it may be able to more actively change a transmission beam according to a location of a UE based on the more efficient beam adaptation.

Figure 7:
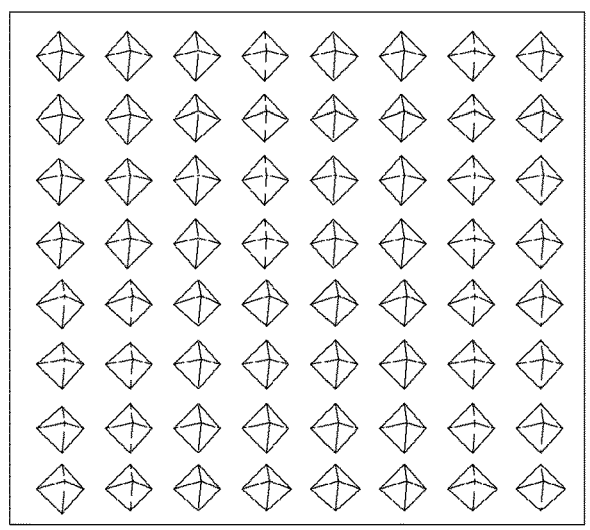
FIG. 7 is a diagram for an active antenna system (AAS)

FIG. 7 is a diagram for explaining a 2D-AAS to which the present invention is applicable. The 2D-AAS shown in FIG. 7 can construct a plurality of antenna systems in a manner of installing a plurality of antennas in vertically direction and horizontal direction.

In particular, if the 2D-AAS shown in FIG. 7 is introduced, a base station is able to control a direction of a beam in up and down direction by antenna elements placed in vertical direction. Hence, when a CRS (cell-specific reference signal) is transmitted, it may be able to differently form a CRS beam for a case of considering UEs located at a position lower than a position of a base station only and a case of considering both the UEs located at a position lower than a position of a base station and UEs located at a position higher than the position of the base station. Yet, since it is highly probable that the number of UEs positioned higher than the base station is relatively smaller than the number of UEs positioned lower than the base station, if all base stations perform a CRS transmission operation in consideration of not only the UEs positioned lower than the base station but also the UEs positioned higher than the base station, it is inefficient.

Hence, in order to efficiently manage a base station supporting UEs existing at a position higher than a position of the base station, the present invention proposes a method for a partial base station among a plurality of base stations to support a UE existing at a position higher than a position of the base station.

In the following, for clarity, a UE positioned higher than a base station is referred to as a HP (high positioning) UE and a UE positioned lower than the base station is referred to as an LP (low positioning) UE. In this case, the HP UE may correspond to UEs mainly supported by beams positioned higher than a base station rather than UEs physically positioned higher than the base station. Similarly, the LP UE may correspond to UEs mainly supported by beams positioned lower than a base station rather than UEs physically positioned lower than the base station.

Embodiment 1

First of all, according to embodiment 1 of the present invention, it is able to configure such a network signaling method as A-1 to A-3 methods to enable a partial base station only among a plurality of base stations to support a HP UE. In this case, assume that all base stations belong to a group i and at least one or more base stations support the HP UE in the group i. This is just an example only. A base station may not belong to any group. The base station not belonging to any group can be configured to support an LP UE only or can be configured to support both the LP UE and the HP UE all the time.

A-1: A specific base station can signal other base stations belonging to a group of the specific base station on whether to support a HP UE. Having received the signaling, the base stations are able to identify specific timing (e.g., signaled timing) at which the specific base station supports the HP UE. Hence, all base stations belonging to a group are able to identify a base station capable of supporting the HP UE.

Moreover, if a single base station is able to support a HP UE only among base stations belonging to a group, the base station supporting the HP UE can be configured to support the HP UE until a different base station belonging to the group transmits signaling to support the HP UE.

A-2: According to the present embodiment, base stations supporting a HP UE can be configured to inform UEs that the base stations correspond to base stations supporting the HP UE at predetermined timing.

A-3: According to the present embodiment, base stations not supporting a HP UE can forcibly make a partial HP UE handover to a base station not supporting the HP UE.

According to the present embodiment, first of all, all base stations should belong to a specific group. If there are a plurality of groups, assume that one or more base stations belong to each of a plurality of the groups. If some base stations do not belong to any group, the base stations can be basically configured to support an LP UE only or can be configured to support both an LP UE and a HP UE all the time. Moreover, a group according to the present invention can be determined in advance or can be determined via signaling between base stations.

Figure 8:
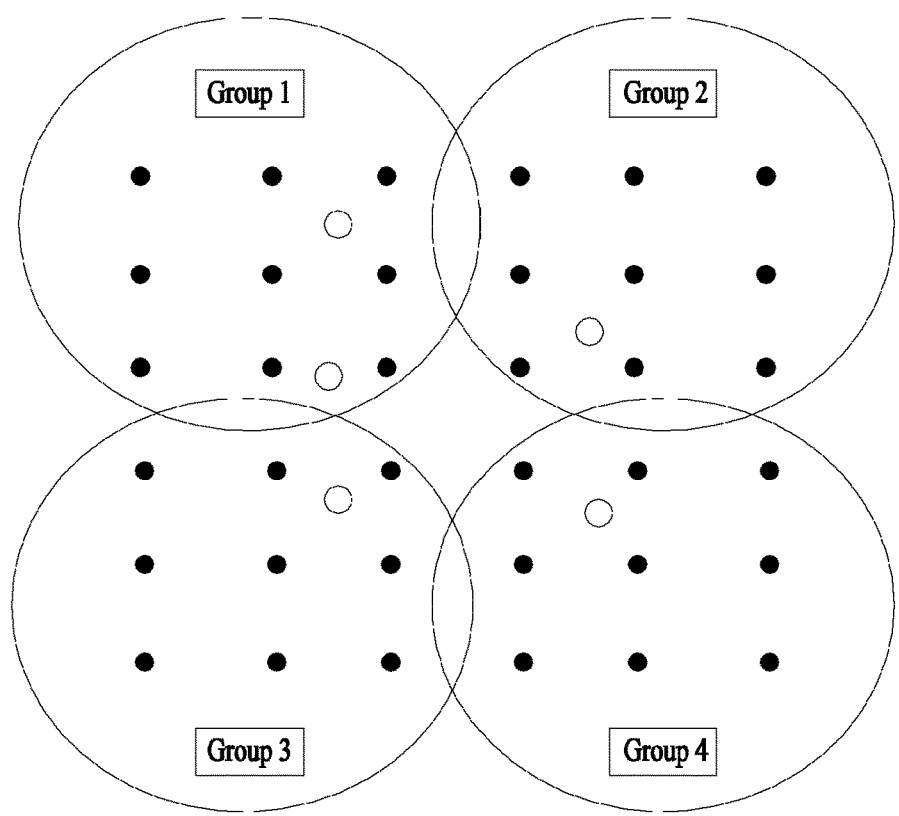
FIGS. 8 to 10 are diagrams for explaining a case of configuring a base station for supporting an HP UE according to the present invention.

FIG. 8 is a diagram for explaining the embodiment 1 of the present invention. Referring to FIG. 8, black circles indicate locations of base stations and white circles indicate locations of HP UEs. In case of FIG. 8, it may be unnecessary for all base stations to support a HP UE. And, although a base station is far from HP UEs, since there are fewer obstacles between the base station and the HP UEs, it is not difficult for the base station to support the HP UEs. Hence, according to the present invention, as shown in FIG. 8, 9 base stations can be configured as a specific group. In this case, since at least one or more base stations support HP UEs in each group, supporting the HP UE has no problem and base stations supporting LP UEs only can efficiently perform base station management.

And, as mentioned earlier in the A-2 method, base stations supporting HP UEs can transmit information indicating that the base stations are able to support the HP UEs at predetermined timing to the UEs via signaling. Of course, although the signaling is not performed, the HP UEs can make a handover (based on legacy LTE system) to a base station supporting the HP UEs by transmitting RSRP (reference signal received power) to the base station. Yet, if the HP UEs receive information on the base station supporting the HP UEs, the UEs identify that the UEs correspond to the HP UEs via CSI-RS (channel state information-reference signal) information and the UEs may make a request for making a handover to the base station supporting the HP UEs.

As mentioned earlier in the A-3 method, if base stations do not support HP UEs, the base stations can forcibly make the UEs perform handover to a base station supporting the HP UEs via PMI (precoding matrix indicator) information through the CSI-RS or SRS (sounding reference signal) information.

Embodiment 2

According to the embodiment 2 of the present invention, base stations check traffic amount of the base stations and may be then able to determine whether to support HP UEs. In particular, as mentioned in the following B-1 to B-3 methods, network signaling can be configured according to the traffic amount of the base stations. In this case, assume that all base stations belong to a group i and at least one or more base stations support a HP UE in the group i. This is just an example only. A base station may not belong to any group. The base station not belonging to any group can be configured to support an LP UE only or can be configured to support both the LP UE and the HP UE all the time.

B-1: Base stations share traffic amount with each other via signaling and N number of base stations including least amount of traffic support HP UEs with a prescribed interval.

B-2: According to the present invention, base stations supporting a HP UE can inform UEs that the base stations correspond to base stations supporting the HP UE at predetermined timing.

B-3: According to the present invention, UEs not supporting a HP UE can be configured to forcibly make a partial HP UE perform handover.

According to the embodiment 2 of the present invention, first of all, all base stations should belong to a specific group. If there are many groups, assume that one or more base stations belong to each of a plurality of the groups. If some base stations do not belong to any group, the base stations can be basically configured to support an LP UE only or can be configured to support both an LP UE and a HP UE all the time. Moreover, a group according to the present invention can be determined in advance or can be determined via signaling between base stations.

Hence, if it is assumed that the base stations are configured as shown in FIG. 8 via grouping, according to the embodiment 2, a base station of large traffic amount supports LP UEs only and N number of base stations of less traffic amount support HP UEs only. By doing so, communication between a base station and a UE can be efficiently performed. In this case, the N can be defined in advance or can be signaled between base stations.

Moreover, as mentioned earlier in the B-2 method, base stations supporting HP UEs can transmit information indicating that the base stations are able to support the HP UEs at predetermined timing to the UEs via signaling. Of course, although the signaling is not performed, the HP UEs can make a handover (based on current LTE wireless communication system) to a base station supporting the HP UEs by transmitting RSRP to the base station. Yet, if the HP UEs receive information on the base station supporting the HP UEs, the UEs identify that the UEs correspond to the HP UEs via CSI-RS information and the UEs may make a request for making a handover to the base station supporting the HP UEs.

Or, as mentioned earlier in the B-3 method, if base stations do not support HP UEs, the base stations can forcibly make the UEs perform handover to a base station supporting the HP UEs via PMI information through the CSI-RS or SRS information.

Embodiment 3

In embodiment 3 of the present invention, a grouping method of a base station capable of being applied to the aforementioned embodiment 1 and the embodiment 2 is explained.

In the embodiment 1 and the embodiment 2, grouping can be applied to all base stations or can be applied to a partial base station only. For example, if a base station has large amount of traffic all the time, the base station may not belong to any group and the base station can be configured to support an LP UE only. Or, if a base station belongs to a group and has small amount of traffic all the time, the base station can be configured to support both an LP UE and a HP UE. And, when grouping is performed, a base station can be configured to belong to a plurality of groups.

Under the aforementioned assumptions, the embodiment 3 of the present invention explains C-1 to C-3 methods that perform grouping on the basis of 3-sector layout.

C-1: A triangle is formed in a manner of binding 3 adjacent base stations with each other and each sector capable of well supporting a triangle region (coverage) is selected from each base station to configure a group.

Figure 9:
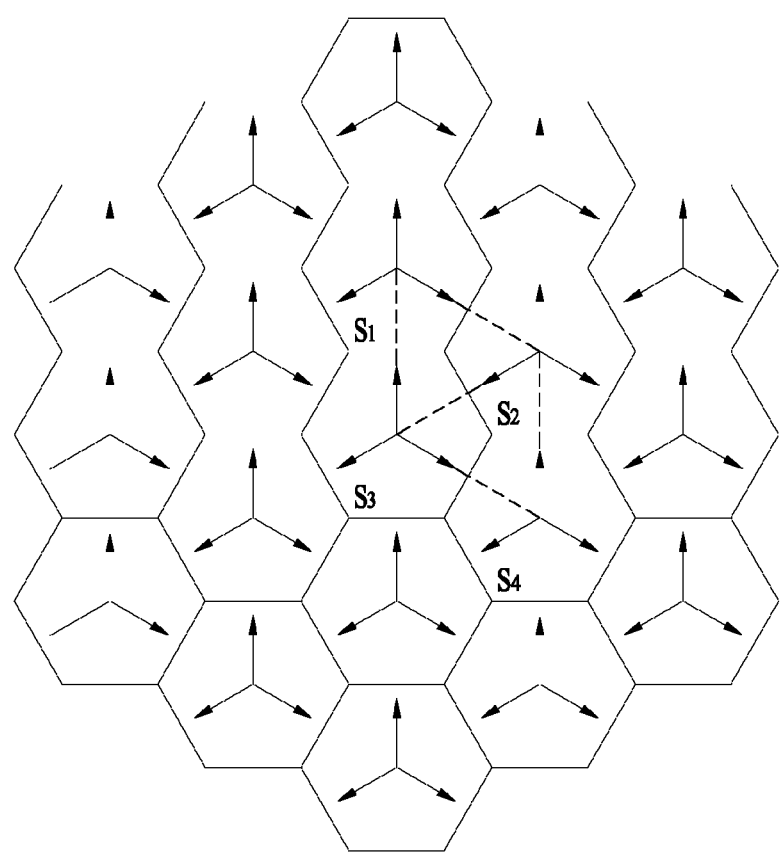
Figure 9:
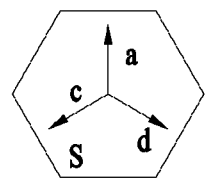

FIG. 9 is a diagram for explaining the C-1 method. Referring to FIG. 9, two triangles drawn by a dotted line correspond to triangles configured by the C-1 method. In FIG. 9, a base station has three sectors including a, b, and c at each location Si. First of all, let's consider a triangle formed by locations of S1, S2, and S3. In this case, it may be able to determine that b sector, c sector, and a sector are able to well support the triangle region in the S1 location, the S2 location, and the S3 location, respectively. Hence, the b sector of the S1 location, the c sector of the S2 location, and the a sector of the S3 location can be formed as a group.

Subsequently, let's consider a different triangle formed by locations of S2, S3, and S4. In this case, it may be able to determine that c sector, b sector, and a sector are able to well support the triangle region in the S2 location, the S3 location, and the S4 location, respectively. Hence, the c sector of the S2 location, the b sector of the S3 location, and the a sector of the S4 location can be formed as a group. A different region forms a triangle consisting of three base stations and a group can be configured by binding three sectors with each other.

In case of using the C-1 method, partial sectors belong to 2 groups at the same time. For example, referring to FIG. 9, it is able to see that the c sector of the S2 location belongs to two groups at the same time. In this case, although it is able to apply the aforementioned embodiments 1 and 2, a system for applying the embodiments can be unnecessarily complex. Hence, according to the present invention, it may be able to additionally apply C-1-1 method.

C-1-1: A triangle is formed in a manner of binding 3 adjacent base stations with each other and each sector capable of well supporting a triangle region is selected from each base station to configure a group. When the group is configured, it may be able to control each sector to belong to a single group only.

The C-1-1 method is explained with reference to FIG. 9. The c sector of the S2 location belonging to two groups at the same time can be excluded from one of the two groups.

If a cell shown in FIG. 9 infinitely exists, each group may have 2 sectors and each sector can be configured to belong to a single group only.

C-2: Two adjacent base stations are connected with each other by a line and a hexagon region is formed by 6 lines. Sectors capable of well supporting the hexagon region are selected from 3 locations among vertices of the hexagon region to configure a group.

Figure 10:
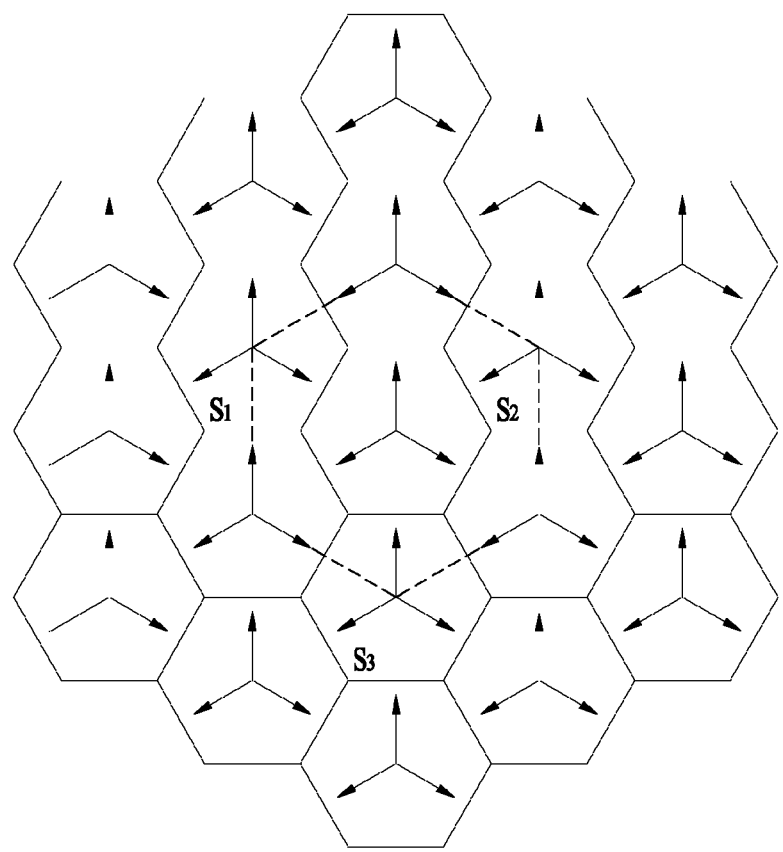
Figure 10:
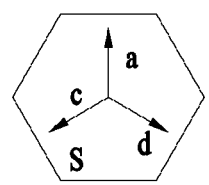
Figure 11:
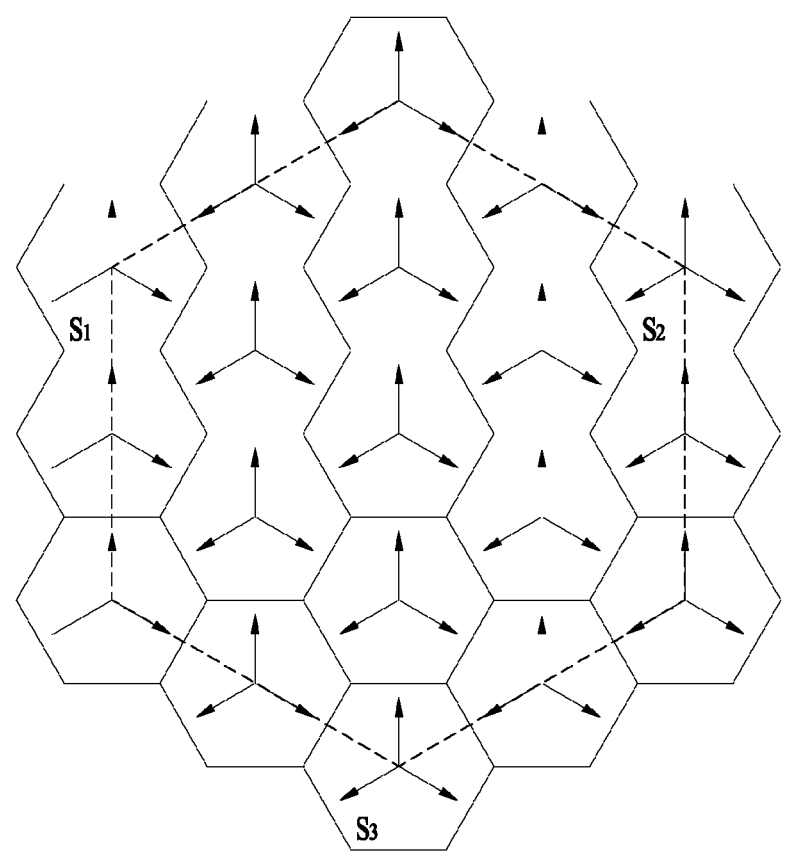
Figure 11:
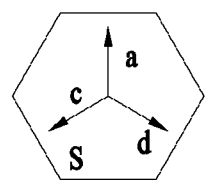

FIGS. 10 and 11 are diagrams for explaining the C-2 method according to the present embodiment. In FIG. 10, a hexagon drawn by a dotted line corresponds to a triangle configured by the C-2 method. In FIG. 10, a base station has three sectors including a, b, and c at each location Si. First of all, let's consider a hexagon formed a dotted line. In this case, it may be able to determine that b sector, c sector, and a sector are able to well support the hexagon region in the S1 location, the S2 location, and the S3 location, respectively. A different region also forms a hexagon using the aforementioned scheme and a group can be configured by binding three sectors with each other.

The C-2 method can also be applied to a case that a hexagon region is adaptively configured. For example, as shown in FIG. 11, in a situation that the number of HP UEs is less, the C-2 method can be extensively applied in a manner of forming a bigger hexagon. In particular, referring to FIG. 11, a group is formed by the b sector of the S1 location, the c sector of the S2 location, and the a sector of the S3 location.

C-3: A group is formed by binding adjacent base stations with each other. In this case, a base station may belong to a plurality of groups.

The embodiment 3 can also be applied to a case of performing grouping to apply the aforementioned embodiment 1 or 2. And, as mentioned earlier in FIGS. 9, 10, and 11, the embodiment 3 can also be applied to a case that a base station is fixed and used after grouping is performed in advance. For example, in FIG. 10, it may be able to configure the b sector of the S1 location, the c sector of the S2 location, and the a sector of the S3 location to be supported only for HP UEs belonging to a hexagon drawn by a dotted line. Similarly, in FIG. 11, it may be able to configure the b sector of the S1 location, the c sector of the S2 location, and the a sector of the S3 location to be supported only for HP UEs belonging to a hexagon drawn by a dotted line. By doing so, the aforementioned embodiment 1 or the embodiment 2 can be applied based on a plurality of base stations configured in advance.

Figure 12:
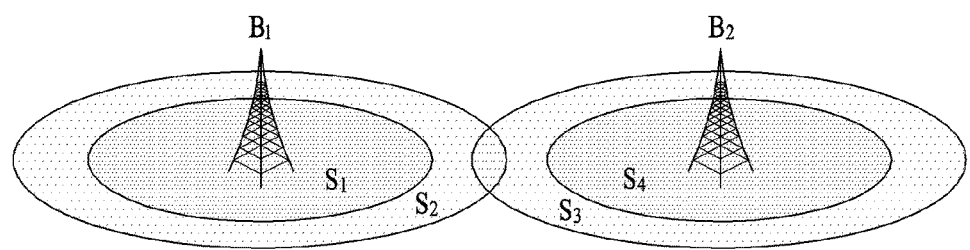

In the following, the present invention is explained in the aspect of vertical sectorization. FIG. 12 is a diagram for explaining vertical sectorization of the present invention. For clarity, FIG. 12 shows a single sector only among 3 sectors in horizontal axis. As shown in FIG. 12, if 2D-AAS is installed in two base stations (B1 and B2), it may be able to use a vertical sector in a manner of dividing the vertical sector by 2. In FIG. 12, a base station B1 configures 2 vertical sectors supporting S1 and S2 regions and a base station B2 configures 2 vertical sectors supporting S3 and S4 regions.

In case of FIG. 12, each of the base stations can configure and manage 2 CRSs, respectively. Yet, in some cases, it may be more efficient to configure a single base station to support the S2 region and the S3 region only among the two base stations. For example, if traffic amount of the B1 base station is large, the B1 base station configures one CRS (e.g., a CRS supporting the S1 region only) only and the B2 base station may use one CRS supporting S4 region and one CRS supporting the S2 and the S3 at the same time. Moreover, in order for the base stations to make a decision on the aforementioned configuration, the base stations can determine whether to support the S2 and the S3 region based on the aforementioned embodiment 1 or the embodiment 2.

And, according to the present invention, a CRS ID can be shared between base stations in a manner of binding some base stations supporting HP UEs with each other and the base stations can transmit a CRS at the same time (i.e., together). In this case, although a base station supporting a HP UE is changed, unlike the A-2 method, the A-3 method, the B-2 method, and the B-3 method, it is not necessary for the HP UE to perform handover or identify the base station supporting the HP UE. Yet, in this case, if the base station supporting the HP UE is changed, a channel can be rapidly changed. Hence, periodic timing for changing a channel can be configured in advance and a channel can be configured to be changed according to the configured period. Or, it may be able to inform HP UEs of changing timing in advance. When channel measurement is performed via a reference signal (RS), the channel measurement can be configured to be performed based on the changing timing.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit is located at the interior or exterior of the processor and may transmit and receive data to and from the processor via various known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of transmitting an enhance reference signal in a wireless communication system supporting multiple antennas and an apparatus therefor are described centering on examples applied to 3GPP LTE system, it may be applicable to various wireless communication systems as well as to the 3GPP LTE system.

What is claimed is:

1. A method of transmitting a signal, the method performed by a first base station (BS) supporting a plurality of vertical beam directions in a wireless communication system that supports multiple antennas and comprising:
   configuring a group of a plurality of BSs including the first BS for a user equipment (UE) at a location higher than locations of the plurality of BSs;
   setting a sector for supporting coverage of the group;
   determining whether to perform beamforming on the set sector for the UE;
   transmitting information to other of the plurality of BSs included in the group, the information indicating that the first BS will perform beamforming for the UE when it is determined to perform the beamforming for the UE; and
   transmitting the signal through the BS transmitting the information to other BSs of the plurality of BSs to the UE in an upward beam direction of the plurality of BSs.

2. The method of claim 1, wherein the signal is transmitted until the other of the plurality of BSs indicate that they will perform the beamforming for the UE.

3. The method of claim 1, further comprising receiving a handover request of the UE from one of the other of the plurality of BSs.

4. The method of claim 1, wherein it is determined to perform the beamforming when an amount traffic received from the other of the plurality of BSs is smaller than an amount of traffic of the first BS.

5. The method of claim 4, wherein the set sector corresponds to a vertical sector determined according to the amount of traffic of the first BS and the amount of traffic received from the other of the plurality of BSs.

6. The method of claim 1, wherein the first BS and the other of the plurality of BSs are configured to have a cell-specific reference signal of an identical identifier.

7. The method of claim 1, wherein determining whether to perform the beamforming is periodically performed according to a predetermined period.

8. A first base station (BS) supporting a plurality of vertical beam directions in a wireless communication system that supports multiple antennas, the BS comprising:
   a radio frequency (RF) unit configured to transmit and receive signals; and
   a processor configured to:
   configure a group of a plurality of BSs including the first BS for a user equipment (UE) at a location higher than locations of the plurality of BSs;
   set a sector for supporting coverage of the group;
   determine whether to perform beamforming on the set sector for the UE;
   control the RF unit to transmit information to other of the plurality of BSs included in the group, the information indicating that the first BS will perform beamforming for the UE when it is determined to perform the beamforming for the UE; and
   control the RF unit to transmit a signal through the BS transmitting the information to other BSs to the UE in an upward beam direction of the plurality of BSs.

9. The BS of claim 8, wherein the signal is transmitted until the other of the plurality of BSs indicate that they will perform the beamforming for the UE.

10. The BS of claim 8, wherein the processor is further configured to control the RF unit to receive a handover request of the UE from one of the other of the plurality of BSs.

11. The BS of claim 8, wherein it is determined to perform the beamforming when an amount traffic received from the other of the plurality of BSs is smaller than an amount traffic of the first BS.

12. The BS of claim 11, wherein the set sector corresponds to a vertical sector determined according to the amount of traffic of the first BS and the amount of traffic received from the other of the plurality of BSs.

13. The BS of claim 8, wherein the first BS and the other of the plurality of BSs are configured to have a cell-specific reference signal of an identical identifier.

14. The BS of claim 8, wherein determining whether to perform the beamforming is periodically performed according to a predetermined period.

* * * * *